United States Patent [19]

Greenway

[11] Patent Number: 4,772,499
[45] Date of Patent: Sep. 20, 1988

[54] NOVEL TEARABLE NON-WOVEN WEBS AND PRODUCTS EMPLOYING SAME

[75] Inventor: John M. Greenway, Westwood, Mass.

[73] Assignee: The Kendall Company, Boston, Mass.

[21] Appl. No.: 913,900

[22] Filed: Oct. 1, 1986

[51] Int. Cl.[4] .............................................. B65D 65/28
[52] U.S. Cl. ...................... 428/43; 156/250; 156/290; 428/40; 428/195; 428/343; 428/354; 428/355
[58] Field of Search ................. 428/195, 198, 43, 343, 428/40, 354, 355; 156/290, 250

[56] References Cited

U.S. PATENT DOCUMENTS

| | | | |
|---|---|---|---|
| 3,093,502 | 6/1963 | Drelich | 428/198 |
| 4,084,033 | 4/1978 | Drelich | 428/198 |
| 4,245,630 | 1/1981 | Lloyd et al. | 428/43 |
| 4,259,390 | 3/1981 | Fahrbach et al. | 428/195 |
| 4,303,724 | 12/1981 | Sergeant et al. | 428/259 |
| 4,379,192 | 4/1983 | Wahlquist et al. | 428/195 |
| 4,427,726 | 1/1984 | Wolfrum | 428/195 |
| 4,601,938 | 7/1986 | Deacon et al. | 428/195 |
| 4,630,603 | 12/1986 | Greenway | 428/343 |

*Primary Examiner*—James J. Bell
*Attorney, Agent, or Firm*—Alvin Isaacs

[57] ABSTRACT

Novel CD-tearable non-woven fabrics having striations or other patternwise areas of substantially depthwise bonding of the fibers whereby the fabric is characterized as being tearable substantially evenly in the unbonded areas, the fabric further being characterized as having substantially greater tensile strength in the MD than is obtainable after manufacture of the fabric and prior to bonding.

Preferably, patternwise bonded areas are provided by impregnating the fabric with a bonding agent.

This invention further includes adhesive tape and other products employing the aforementioned non-woven fabrics.

15 Claims, 1 Drawing Sheet

NOVEL TEARABLE NON-WOVEN WEBS AND PRODUCTS EMPLOYING SAME

BACKGROUND OF THE INVENTION

The present invention is directed to nonwoven fabrics and, more particularly, to sheets or strips of nonwovens, including adhesive tapes and the like having nonwoven backings and which are readily and substantially evenly tearable in the CD direction.

The art of manufacturing nonwovens has become a major industry and, in what may be regarded as as highly crowded and competitive art, the patent literature is replete with references thereto.

Without intending to be a complete survey of the art, it can be stated broadly that nonwovens are produced by bonding or entangling natural or synthetic fibers or admixtures thereof.

In one such procedure, the fibers are first carded to orient them primarily in the MD direction, e.g. in a tensile ratio on the order of 9:1, MD to CD. The carded fibers may then be subjected to scrambling after which they may be thermally bonded, e.g. by calendering or point bonding, chemically bonded, or hydroentangled to produce the nonwoven fabric.

In lieu of carding, the fibers may be spunbond or melt blown, followed by airlaying, and then thermally or chemically bonded or hydroentangled.

Irrespective of the method of manufacture it can be said that the nonwovens generally possess much greater tensile strength in the MD direction. Nevertheless, they are not readily tearable uniformly in the CD direction absent some special treatment of the nonwoven fabric to render them so tearable.

High MD strength is a requirement of CD-tearable nonwovens. Techniques which are postulated for promoting CD tear include scoring lines across the fabric to create a weak area which the CD tear would tend to follow; perforating in the cross direction in a similar manner to paper towels; or orienting the fibers in the web predominantly in the CD so that the tear would follow the CD-oriented fibers. However, each of these procedures to facilitate CD tear would materially reduce the potential MD strength and would accordingly not be feasible in products of the type herein contemplated where MD strength is advisable if not an essential requirement.

Other methods of preparing tearable nonwoven sheet materials and/or adhesive tapes made therefrom have been reported in the patent literature. Without intending to constitute a comprehensive survey of the prior art, the following are nevertheless considered to be illustrative of the state of the art.

U.S. Pat. No. 4,233,976 issued to Wayne K. Dunshee discloses a styptic device capable of stopping bleeding in minor wounds and which comrises a porous web of hydrophobic fibers, at least about 50 microns thick, containing a styptic material. A preferred web is said to be a nonwoven web of compacted fibers formed of interlaced staple rayon (or equivalent) textile fibers which is unified by the impregnation with water-insoluble rubbery-fiber-binding/sizing agent that coats the individual fibers without filling the interstices and bonds them together at their crossing points to provide a thin, pliable, inextensible, resilient, water-resistant, porous cloth-like fabric that is said to be strong and tough enough for use in the claimed invention and yet is finger tearable so that the styptic device can be applied from a roll without having to be cut.

U.S. Pat. No. 4,292,360 issued to Riedel et al discloses a multi-ply nonwoven sheet material and pressure-sensitive adhesive tape made therefrom, the nonwoven material comprising a first layer of randomly interlaced fibers bonded to each other by a rewettable binder and at least one additional layer of randomly interlaced fibers bonded to each other and to the first layer by a rewettable binder. The fibers of the additional layer are laid directly on the first layer prior to application of the binder to the additional layer. Various fibers were employed and their tear and other properties described in the illustrative examples and Table 1 which follows. In general, their tear properties in the MD and CD are fairly similar. For instance, with the rayon fabric prepared in Example 1, the MD tear was 1.5 pounds, while the CD tear was 1.0 pounds.

U.S. Pat. No. 4,303,724 issued to Sergeant et al teaches a flexible adhesive tape comprising a pliable base and a low-count open meshed fabric adhered thereto by a layer of adhesive possesses improved tear properties by using a so-called texturized or false-twist yarn in the filling of the fabric.

The task of the present invention can be stated to be to provide nonwoven fabrics and tapes made therefrom which are characterized as being finger tearable substantially evenly in the CD and which are further characterized as having substantially greater tensile strength in the MD.

BRIEF DESCRIPTION OF THE INVENTION

In accordance with the present invention this task is solved by the patternwise impregnation in the cross direction with a bonding agent of a nonwoven sheet material made by any of the per se known processes, the impregnation being substantially throughout the thickness, whereby the sheet material is substantially uniformly and evenly finger-tearable in the cross direction in the areas of no impregnation with the bonding agent, i.e. areas intermediate two adjacent patternwise impregnations.

Preferably, the patternwise impregnation with the bonding agent comprises a series of substantially parallel stripes or striations across the sheet material extending from near one (leading) end of the sheet material to near the other (trailing) end.

DETAILED DESCRIPTION OF THE INVENTION

Figure 1:
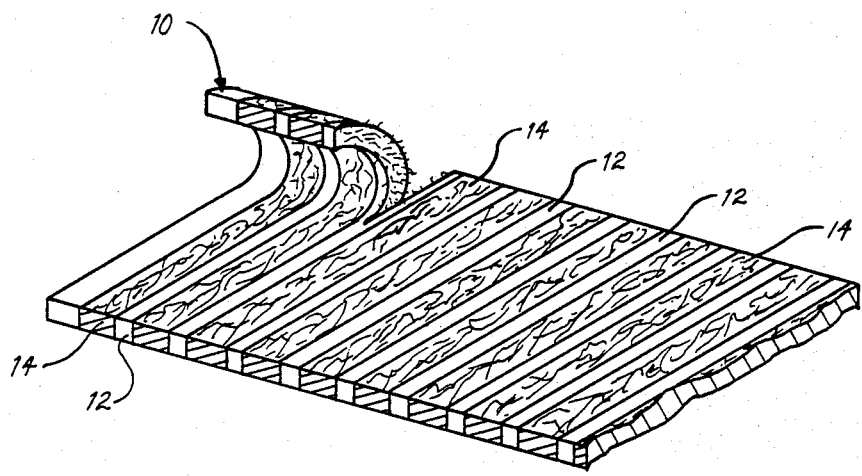
FIG. 1 is a perspective view of a partially torn portion of a nonwoven strip prepared in accordance with this invention.

As previously mentioned, the present invention relates to improving the CD tear characteristics of nonwoven materials or webs while at the same time improving its MD tensile strength. More specifically, it can be described as being directed to the task of enabling the nonwoven web to have precise tear in the cross direction with minimal ragged edges of loose fibers usually associated with a tear in a nonwoven fabric while concomitantly materially enhancing its tensile strength in the machine direction. The latter property, namely increased tensile strength in the MD, is an essential part of this invention.

CD-tearable fabrics or tapes are generally based upon gauze substrates, due to their characteristics as compared with nonwoven fabrics.

The low stretch characteristics of the warp or MD yarns in the gauze substrate tend to focus the load at the point of tear and cause the fibers to fail in sequence in a predictable manner. A nonwoven fabric, on the other hand, stretches in the MD before tearing, which in turn causes the load to be distributed. Moreover, some of the fibers pull out of the nonwoven fabric without breaking, thus creating weak areas away from the point of the tear. The distributed load and the weak areas away from the point of tear contribute to the tear propagating in an uncontrollable manner which seldom follows the CD.

Secondly, the structure of the gauze causes the tear to propagate between the weft (CD) yarns. The weft yarns tend to guide the tear and to encourage it to follow the direction of initiation of the tear. The CD yarns also promote a straight tear across the structure. In contrast thereto, nonwoven webs are usually much stronger in the MD than in the CD and therefore tear easier in the MD. Tears which start in the CD have a tendency to change direction and travel along the MD.

Finally, the structure of the gauze isolates the load at the point tear and cause the fibers to break cleanly along the line of tear without leaving a ragged edge. On the other hand, the fibers which pull out of a nonwoven structure create a ragged edge of loose fibers.

For these reasons, it is generally understood and accepted in the art that woven fabrics have CD tear properties vastly superior to nonwovens and are accordingly employed as backings for tapes and the like which are intended to be finger-tearable. It is nevertheless desirable from the cost standpoint and for other reasons to provide nonwoven backings for tearable tapes.

Nonwoven tapes can be made more readily tearable in the CD by such techniques as scoring or perforating in the cross direction. CD tearing may also be facilitated by orienting the fibers in the web predominantly in the CD. However, all of these various approaches would considerably weaken the web in the MD. However, since high MD strength is an essential requirement for marketability for a CD tearable tape, these approaches are not commercially feasible.

In accordance with the present invention, a nonwoven fabric produced in per se known manner (e.g. as discussed previously in the "BACKGROUND") is impregnated substantially depthwise with a binder or bonding agent in a patternwise disposition to provide relatively narrow tearable non-impregnated CD areas "sandwiched" or bounded by the bonded areas. The bonding agent is preferably applied in perpendicular lines or striations on the order of at least an eighth of an inch wide. Preferably, the unbonded space inbetween, i.e. the separation between adjacent striations is on the order of a sixteenth of an inch or less to insure a substantially straight tear between adjacent bonded areas in the CD direction, as well as reducing the ragged edge of fibers which may result from the tear.

The invention will best be understood by reference to the illustrative drawing.

As shown therein a web of nonwoven fibers 10 is impregnated substantially depthwise with a bonding agent 14, e.g. a per se known bonder or sizing agent in a striated pattern to provide intermediate spaces 12 in the cross direction which contain no bonding agent.

The bonded regions will reduce the tendency for the fiber to slip in the MD and will focus the load at the point of tear and hence guide the tear across the web. It will lock the fibers in place on either side of the tear and reduce the tendency for the fibers to pull out of the structure without breaking. This will in turn reduce or eliminate the ragged edge of loose fibers generally associated with a tear in a nonwoven. The bonded regions will also hold the fiber in place so as to obviate the presence of loose fibers. Moreover, the lines of binder will secure the fibers in place and thereby increase the MD strength of the web substantially beyond the strength obtainable during the manufacture of the nonwoven prior to bonding. Moreover, the lines of binder will reduce the MD elongation or stretch and therefore increase the MD modulus. This will in turn permit the use of manufacturing processes and products which heretofore could not be considered because they did not produce nonwovens having the requisite high MD tensile strength for the contemplated usage.

The particular fiber compositions which may be employed per se comprises no part of this invention and may accordingly be selected from those heretofore known in the nonwoven art, according to the web properties desired. For example, they may be selected from the naturally occurring animal or vegetable fibers, including cotton and wool, or synthetic (chemical) fibers such as rayons, polyesters, polyamides, acrylics, etc., including blends of such fibers.

As mentioned earlier, nonwoven webs from such staple fibers may be made in accordance with the per se known techniques, it being understood, however, that the method of manufacture should render the web "tearable" in the cross direction. As used herein and in the appended claims, the term "tearable" denotes the web is capable of being evenly torn in the CD after imprenation of the thus formed nonwoven with a bonding agent in accordance with this invention. In this context, a nonwoven web will be tearable if it is not chemically or thermally bonded such that there is elongation to spread the load and the bonding of the fibers during manufacture is not so great a magnitude that the patternwise impregnation with binder after manufacture in accordance with this invention cannot lock the fibers any more than they have been already locked or adhered during manufacture.

A particular preferred method for making nonwoven webs useful in the practice of this invention is by the process known in the art as "hydroentangling." Hydroentangled nonwoven manufacture is described and claimed, for example, in U.S. Pat. Nos. 3,485,706; 3,486,168; 3,493,462; 3,494,821; and 3,508,308. By way of illustration, reference is made to the aforementioned U.S. Pat. No. 3,485,706 which teaches that a wide variety of textile-like nonwoven fabrics may be produced by traversing fibrous material with high energy liquid streams while supported on a perforated plate, woven screen or the like, so as to consolidate the material in a repeating pattern of entangled fiber regions and interconnecting fibers. The fibers are thus randomly entangled in a manner which holds the fibers in place without the need for bonding agents. As is stated, the initial layer of fibers may consist of any web, mat or batt of loose fibrous elements, disposed in random relationship with one another or in any degree of alignment, such as might be produced by carding or the like.

In one preferred hydroentangling method in accordance with this invention, a lap of natural, cellulosic or wholly synthetic fibers (or a blend of fibers) is first carded to orient the fibers predominantly in the MD (e.g. in an MD/CD ratio of one the order of 9:1), then subjected to air mixing or scrambling (e.g. to provide a MD/CD ratio of on the order of 5:1); subjected to hydroentangling by subjecting to water jets at pressures on the order of 200 psi or greater, and then dried. Typically, webs produced in this manner may be on the order of three feet in width and possess a thickness of, say, for example, 20 mils.

A nonwoven web prepared in known manner, e.g. by hydroentangling procedures as described above, may then be subjected to a patternwise, substantially depthwise impregnation with a bonding agent in accordance with this invention.

The binder which may be employed will be a matter of individual choice within the judgment of the skilled worker, provided, of course, that it performs its intended function, namely, that it has the requisite cohesiveness to lock the fibers in place and to focus the load at the point of tear. Suitable bonding agents will be readily ascertainable by those skilled in the art in the light of this description of the invention and may, for example, be selected from those heretofore known for binding fabrics. By way of illustration, mention may be made of homopolymers or copolymers of synthetic latexes such as butadiene, acrylics, vinyls (vinyl acetate,vinyl ethers, vinyl esters, vinyl chloride, etc.) and the like.

The manner of applying the binder to the nonwoven web is also not critical and any of the various methods known in the coating art may be employed, e.g. screen printing, gravure printing, padding and the like. [In the illustrative examples which follow, a simple mask was placed over the web and the binder was "painted on" through slits in the mask to demonstrate the efficiency of the invention on a laboratory scale. Obviously, the known more sophisticated coating procedures would be employed in production runs.]

The following examples show by way of illustration and not by way of limitation, the practice of this invention.

EXAMPLE 1

A 30 grams per square yard (gms/yd$^2$) nonwoven fabric approximately 3 feet wide and 25 mils thick was first made by the known hydroentangling process (as described above), employing 1.5 denier, 1-9/16" rayon fibers hydroentangled on a 100×100 mesh screen. The web was then cut lengthwise into two inch strips. A mask having parallel CD slits about ¼" wide and spaced approximately ⅛" apart, was then placed over the strip. A binder solution was prepared comprising:

| | |
|---|---|
| GenFlo 3001 (trademark of Diversitech General for an aqueous latex, 51% total solids pH 8.4; Tg(c)-30 | 200.0 ml |
| Tween 20 (trademark of Atlas Chemical Industries for a polyoxyethylene sorbitan monolaurate surfactant | 4.0 g |
| Alcogum L15 (trademark of Alco Chemical Corp. for a sodium polyacrylate thickener | 4.0 g |

The above binder solution was applied over the surface of the mask with a paint roller to impregnate the nonwoven strip with striations conforming to the slits in the mask. The impregnated strip was then dried. Substantially no lateral diffusion of the binder was observed. The strip tore uniformly and cleanly in the cross direction.

EXAMPLE 2

The above procedure was repeated, employing a 35 gms/yd$^2$ nonwoven fabric strip prepared by the hydroentangling process,using a 13×13 90° screen to form the fabric structure. Again, the strip tore uniformly and cleanly in the CD.

EXAMPLE 3

Example 1 was repeated, substituting a chemically bonded fabric. Once more, a clean CD tear was obtained.

As mentioned, the prior illustrative examples provided the striations of binder utilizing what may be regarded as laboratory equipment.

In the following examples, use was made of two different silk screen patterns. The first silk screen (Pattern 1) had an engraved area of 0.080 inch in width to provide the impregnation and these areas were spaced 0.070 inches apart. The second screen pattern (Pattern 2) had an engraved area 0.180 inch wide with spaces between of 0.100 inch. The cell depth of the screens was on the order of 0.008 inch.

EXAMPLE 4

The aforementioned silk screen, Pattern 1 was placed over a strip of 33 gms/yd$^2$ 100% polyester nonwoven fabric made by hydroentangling (HEF) the carded web fibers on a 100×100 mesh screen. A binder solution comprising the following:

| | |
|---|---|
| GenFlo 3049 (trademark of Diversitech General for a carboxymodified styrene-butadiene latex; 36% solids; Tg(c)-10 | 960.0 g |
| Triton X-100 (trademark of Rohm and Haas for a octylphenoxypolyethoxyethanol surfactant) | 6.8 g |
| Alcogum L15 | 40.0 g |
| Artilene Blue dye | 5.0 g |
| Ammonium hydroxide to adjust pH to 8.0 | | was applied over the surface of the screen with a squeegee to impregnate the nonwoven strip with striations conforming to the slits in the screen. The impregnated strip was then dried.

EXAMPLE 5

Example 4 was repeated, employing a 36 gms/yd$^2$ 50-50 polyester/rayon nonwoven fabric entangled on a 13×13 90° mesh screen for the web of Example 4.

EXAMPLE 6

Example 4 was repeated, employing a 46 gms/yd$^2$ 50-50 polyester/rayon fabric entangled on a 22×24 90° mesh screen and substituting the following binder solution:

| | |
|---|---|
| Water | 300.0 g |
| Rhoplex HA 8 (trademark of Rohm and Haas for an acrylic latex water emulsion) | |
| Triton X-100 | 6.8 g |
| Alcogum L15 | 32.0 g |
| Artilene Blue dye | 5.0 g |
| Ammonium hydroxide to adjust pH to 8.0 | |

EXAMPLE 7-9

Example 4-6 was repeated, substituting the silk screen pattern 2 for Pattern 1 used in the preceding examples. In examples 3-9, it will be noted that a blue dye was included in the binder composition. While not an essential element of this invention, the use of a dye or pigment colorant may be desirable or expedient in determining where the binder is deposited and, further, to establish visually whether there is any "bleeding" or lateral diffusion of the binder resulting in lack of uniformity of the contemplated patternwise impregnation.

The striated samples of Examples 7-9 were tested for relevant physical properties, namely weight, MD tensile strength, CD tear as determined by a standard trapezoidal tear test, and elongation.

The results of these tests are set forth in the following table.

| Sample | Fiber Blend | Weight (gms/yard$^2$) BEFORE | Weight (gms/yard$^2$) AFTER | MD STRIP tensile/in BEFORE | MD STRIP tensile/in AFTER | Trapezoidal Tear BEFORE | Trapezoidal Tear AFTER | ELONGATION BEFORE | ELONGATION AFTER |
|---|---|---|---|---|---|---|---|---|---|
| 100 × 100 MESH (EXAMPLE 7) | 100% POLYESTER | 33.7 | 62.0 | 13.3 | 20.0 | 8.7 | 3.0 | 44.0 | 17.0 |
| 13 × 13 MESH (EXAMPLE 8) | 50% POLYESTER; 50% RAYON | 36.1 | 85.0 | 7.1 | 9.5 | 4.7 | 2.0 | 31.4 | 11.8 |
| 22 × 24 MESH (EXAMPLE 9) | 50% POLYESTER; 50% RAYON | 46.3 | 89.0 | 11.0 | 14.0 | 8.3 | 3.0 | 40.0 | 26.4 |

The foregoing examples clearly and unequivocally establish the efficacy of the invention. As noted, the striations were about a quarter of an inch wide and spaced apart with unbonded areas of about an eighth of an inch. These experiments were performed in the laboratory with what, from a production standpoint, would be regarded as crude equipment.

As mentioned, production equipment well known in the art, e.g. silk screening to name one, would make it possible to employ thinner stripes with narrower separations therebetween.

Thus, while the above examples provide useful tearable strips and establish the commercial feasibility of the invention, it is contemplated that improvements would be obtained if there were more tearable spaces per inch, e.g. if the stripes of binder were, say, on the order of an eighth of an inch and the space between was on the order of a sixteenth of an inch.

In any event, it is to be understood that the width of binder should be no greater than needed to perform its function. It will also be understood that the stripes should be as close together as possible for optimum results in terms of a clean, uniform tear. Because of the possibility of at least some lateral diffusion, it is however anticipated that there may be some difficulty providing spaces between striations of much less than a sixteenth on an inch.

The selection of optimum conditions for the striations with binder, as well as the limitations, will at best involve routine experimentation by the skilled worker in light of the foregoing description.

The tearable nonwoven strips of this invention may be employed to provide a whole host of tearable products of the type known in the art.

Of particular interest are adhesive tapes, both medical and industrial. In this context, it will be appreciated that the nonwoven strip may be employed as the backing material for the known adhesives, e.g. natural or synthetic rubber, acrylics and the like. For example, it may be coated with an adhesive formulation comprising 94% iso-octyl acrylate and 6% acrylic acid, as described in the aforementioned U.S. Pat. No. 4,292,360; or a rubber-based adhesive comprising 40% rubber, 30% fillers, 28% tackifier resins and 2% process aids, as described in the aforementioned U.S. Pat. No. 4,303,724. As will be appreciated, the adhesive formulation which may be applied to the nonwoven backing of this invention may be pressure sensitive or heat- or water-activated, as desired.

Figure 2:
FIG. 2 is a sectional view illustrating an adhesive tape employing the nonwoven strip of FIG. 1.

FIG. 2 illustrates, in its simplest form, an adhesive tape contemplated by this invention. As shown therein, the tape comprises a binder-impregnated web 10 of the type illustrated in FIG. 1 coated with a layer of adhesive 16. As previously stated, adhesive layer 16 may comprise any of the per se known adhesives, as desired by the practitioner. It may for example be a known pressure-sensitive rubber-based adhesive formulation, e.g. an adhesive comprising butyl rubber, tackifier, filler and the other reagents generally included in such formulations.

While the adhesive strip is illustrated in FIG. 2 in its simplest form, it will be appreciated by those skilled in the art that it may contain other elements. For example, web 10 may be provided with a backing material, e.g. a polyolefin such as polyethylene or polypropylene. In like manner, adhesive layer 16 may contain a release sheet.

So-called two-faced tapes are also contemplated, i.e. tapes where the web 10 is "sandwiched" between two outer adhesive layers.

It will also be appreciated that the nonwoven webs of this invention may be employed in the manufacture of various non-adhesive articles. Various chemicals may be incorporated during the manufacture of the nonwoven or prior to applying the binder to adapt the strip for specific desired uses. Bioactive reagents, e.g. bactericides, may be incorporated. It may be employed to provide a styptic devise as suggested by the aforementioned U.S. Pat. No. 4,233,976.

The nonwoven webs of this invention may further be employed to provide wiping materials, towels and the like which heretofore have score or fracture lines in spaced relationship, e.g. on the order of every twelve inches, to facilitate tearing. In this case, it is postulated that the striations should be spaced further apart than with the tapes heretofore discussed.

By way of recapitulation, the present invention is applicable to the various products to which nonwovens may be employed where easy tearing in the CD is desired as well as tensile strength in the MD. The essence of the present invention is the concept of providing a nonwoven, as herein described, which provides the desired CD tearability not obtainable during manufacture while at the same time providing substantially greater MD tensile strength than was obtained by manufacture of fabric.

While reference has been made in the foregoing description and illustrative examples to providing the bonded areas by impregnating the fabric with a bonding agent, it is to be expressly understood that the present invention also contemplates providing the patternwise bonded areas by thermally bonding. In this context, impregnation with a bonding agent and thermally bonding to provide the bonded striations or other pattern are to be regarded as alternate procedures.

An important advantage of the present invention is its applicability to the various systems of nonwoven manufacture heretofore known in the art. No new production equipment need be substituted for this purpose. The nonwoven webs are produced and slit in the usual manner. All that is then required is readily available production equipment for impregnation with binder or thermally bonding in a patternwise manner, as herein described.

The invention is applicable to the various fibers, or mixtures of fibers, heretofore employed in the manufacture of nonwovens. The particular fibers selected will of course depend upon the properties desired for the contemplated end use.

While reference has been made to parallel striations, e.g. perpendicular to the lateral edges of the strip, it is to be expressly understood that the patternwise impregnation is not so restricted. Various angles or patterns may be applied, according to individual whim or desire.

Since certain changes may be made without departing from the scope of the invention herein described, it is intended that all matter contained in the foregoing description, including the examples, shall be taken as illustrative, and not in a limiting sense.

I claim:

1. A product comprising a cross direction-tearable non-woven fabric having a plurality of closely parallel patternwise areas of substantially depthwise bonding of the fibers of said fabric, said parallel patternwise areas of bonding extending in the cross direction from one edge of said fabric to the opposed edge, the unbonded fibers between adjacent parallel patternwise areas of bonding being narrower in width than the width of said bonded areas, said non-woven fabric being characterized as being tearable substantially evenly in the cross direction between adjacent areas of bonding.

2. A product as defined in claim 1 wherein said bonded areas comprise a bonding agent adhering said fibers in areas of said bonding agent.

3. A product as defined in claim 1 including an adhesive layer on at least one surface of said fabric.

4. A product as defined in claim 3 wherein said adhesive layer comprises a pressure-sensitive adhesive.

5. In a non-woven fabric manufactured in known manner wherein said fabric is characterized as possessing a given tensile strength in the machine direction and by not being readily tearable in the cross direction; the improvement wherein said fabric has a plurality of closely parallel patternwise areas of substantially depthwise bonding of fibers extending in the cross direction from one edge of said fabric to the opposed edge, the unbonded areas of fibers between adjacent parallel areas of bonding being narrower in width than the width of said bonded areas, whereby said fabric is finger tearable in the cross direction substantially evenly in said narrower unbonded areas, said fabric further being characterized as having greater tensile strength in the machine direction than said given tensile strength.

6. A fabric as defined in claim 5 wherein said bonded areas are in the form of parallel striations extending in the cross direction substantially perpendicular to the longitudinal edges of said fabric.

7. A fabric as defined in claim 6 wherein said bonded areas consist of fibers of said fabric bonded together by a chemical bonding agent.

8. A fabric as defined in claim 5 wherein the fibers of said fabric are hydroentangled.

9. An adhesive product having an adhesive layer carried on a backing layer comprising a non-woven fabric as defined in claim 6.

10. An adhesive product as defined in claim 8 in the form of a tape having a length substantially greater than its width.

11. A product as defined in claim 10 wherein said striations consist essentially of fibers of said fabric bonded by a chemical bonding agent.

12. A method of making a finger-tearable non-woven fabric comprising the steps of:
    (1) making a non-woven fabric from natural or synthetic fibers in known manner; and
    (2) selectively bonding said fibers substantially depthwise in the cross direction from one edge of the fabric to the opposite edge in a predetermined pattern comprising a plurality of closely parallel bonded areas, the unbonded areas between adjacent parallel bonded areas being narrower in width than the width of said bonded areas, said bonding rendering the fabric finger tearable in unbonded areas between adjacent bonded areas.

13. A process as defined in claim 12 wherein said selective bonding is provided by the patternwise impregnation of said fabric with a chemical bonding agent.

14. A process as defined in claim 13 wherein said patternwise impregnation comprises substantially parallel striations in the cross direction.

15. A process as defined in claim 14 including the step of coating a layer of adhesive on at least one side of said fabric.

* * * * *